United States Patent
Park et al.

(10) Patent No.: US 9,137,510 B2
(45) Date of Patent: Sep. 15, 2015

(54) IMAGE PROCESSING METHOD, IMAGE PROCESSOR AND STEREOSCOPIC IMAGE DISPLAY DEVICE USING THE IMAGE PROCESSOR

(75) Inventors: Myungsoo Park, Seoul (KR); Jaewoo Lee, Paju-si (KR); Hanseok Kim, Paju-si (KR); Taewook Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 570 days.

(21) Appl. No.: 13/548,002

(22) Filed: Jul. 12, 2012

(65) Prior Publication Data
US 2013/0016095 A1    Jan. 17, 2013

(30) Foreign Application Priority Data

Jul. 14, 2011  (KR) .................. 10-2011-0070071

(51) Int. Cl.
  *H04N 13/00*  (2006.01)
  *H04N 13/04*  (2006.01)
(52) U.S. Cl.
  CPC ......... *H04N 13/0018* (2013.01); *H04N 13/007* (2013.01); *H04N 13/0037* (2013.01); *H04N 13/0434* (2013.01); *H04N 13/0452* (2013.01); *H04N 13/0456* (2013.01)
(58) Field of Classification Search
  None
  See application file for complete search history.

(56) References Cited

U.S. PATENT DOCUMENTS

| | | | | |
|---|---|---|---|---|
| 6,095,650 A | * | 8/2000 | Gao et al. | 351/227 |
| 6,389,153 B1 | * | 5/2002 | Imai et al. | 382/106 |
| 2004/0066555 A1 | * | 4/2004 | Nomura | 359/462 |
| 2005/0036673 A1 | * | 2/2005 | Ohba et al. | 382/154 |
| 2005/0271252 A1 | * | 12/2005 | Yamada | 382/103 |
| 2007/0008314 A1 | * | 1/2007 | Song et al. | 345/419 |

FOREIGN PATENT DOCUMENTS

| | | |
|---|---|---|
| CN | 1816160 A | 8/2006 |
| CN | 1917560 A | 2/2007 |
| CN | 101868564 A | 11/2010 |

OTHER PUBLICATIONS

Haiqing, M., "Research on Text Location in Natural Scenes Using Edge Detection and Texture Analysis," Dissertation for Master Degree in Engineering, Jul. 2007, Harbin Institute of Technology, People's Republic of China, sixty-eight pages [with English abstract].

State Intellectual Property Office of the People's Republic of China, First Office Action, Chinese Patent Application No. 201210243510.2, Apr. 17, 2014, twenty-one pages.

* cited by examiner

*Primary Examiner* — Said Broome
(74) *Attorney, Agent, or Firm* — Fenwick & West LLP

(57) ABSTRACT

This embodiments herein relate to an image processing method and a stereoscopic image display device that provide high readability of a text area when implementing both 2D images and 3D images. The embodiments described herein convert the left(right)-eye image data corresponding to the left(right)-eye coordinates into a mean of the left(right)-eye image data corresponding to the left(right)-eye coordinates and the left(right)-eye image data adjacent to thereof on the other line. Therefore, the embodiments described herein may compensate for the left(right)-eye conversion data which are not arranged on a 3D format. As a result, the embodiments described herein may improve readability of the text area in the 3D mode. Also, the embodiments described herein may improve readability on the text area by applying a sharpness filter to the original 2D image corresponding to the 2D coordinates which is detected as the text area in the 2D mode.

21 Claims, 22 Drawing Sheets

FIG. 3
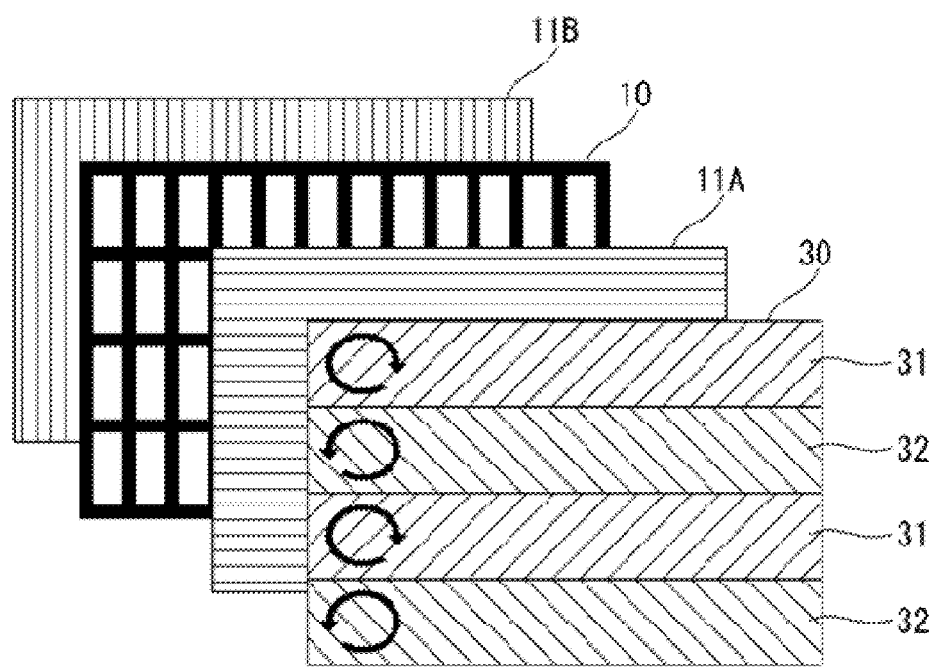
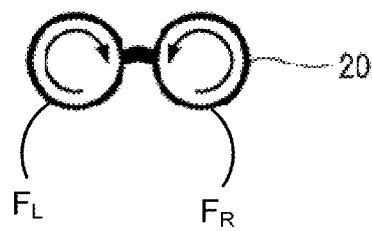

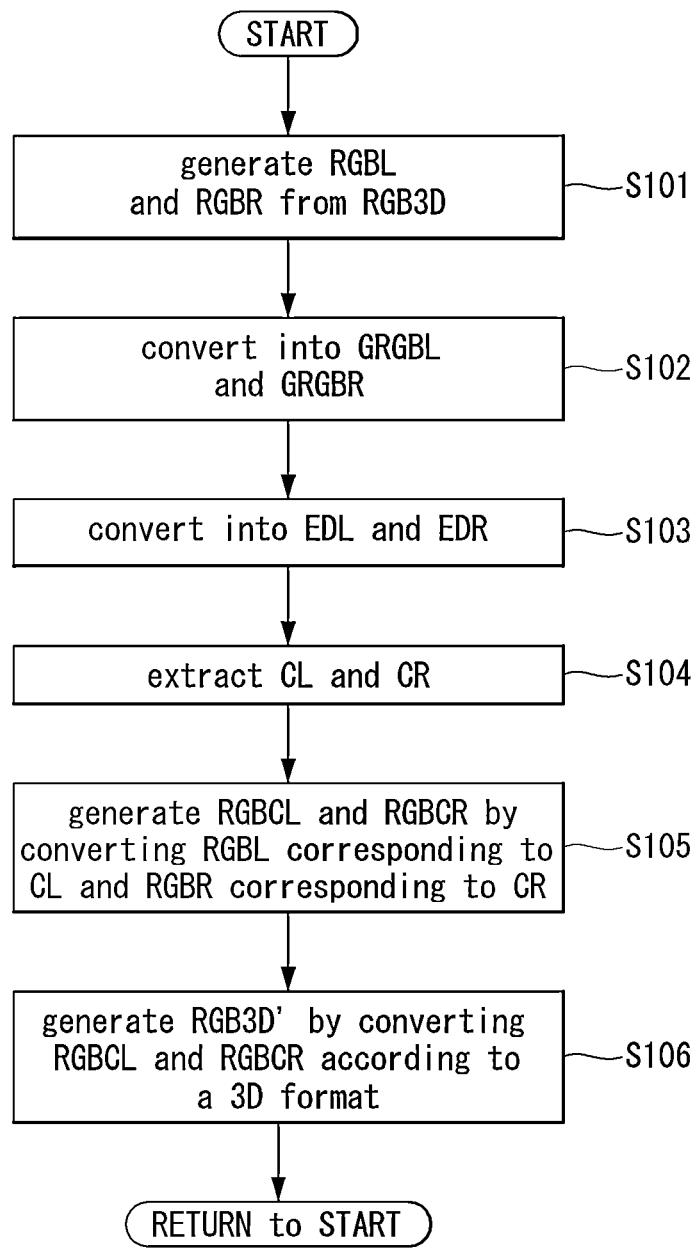

FIG. 10

| 1L |
|---|
| 2L |
| 3L |
| 4L |
| ⋮ |
| 1079L |
| 1080L |

< RGBCL >

| 1R |
|---|
| 2R |
| 3R |
| 4R |
| ⋮ |
| 1079R |
| 1080R |

< RGBCR >

| 1L |
|---|
| 2R |
| 3L |
| 4R |
| ⋮ |
| 1079L |
| 1080R |

< RGB3D' >

FIG. 11

| 1L |
|---|
| 2L |
| 3L |
| 4L |
| ⋮ |
| 1079L |
| 1080L |

< RGBCL >

| 1R |
|---|
| 2R |
| 3R |
| 4R |
| ⋮ |
| 1079R |
| 1080R |

< RGBCR >

| 1L |
|---|
| 2R |
| 3L |
| 4R |
| ⋮ |
| 1079L |
| 1080R |

< RGB3D' (Nth frame) >

| 2L |
|---|
| 1R |
| 4L |
| 3R |
| ⋮ |
| 1080L |
| 1079R |

< RGB3D' (N+1)th frame >

ND STEREOSCOPIC IMAGE
IMAGE PROCESSING METHOD, IMAGE PROCESSOR AND STEREOSCOPIC IMAGE DISPLAY DEVICE USING THE IMAGE PROCESSOR

CROSS-REFERENCE TO RELATED APPLICATION

This application claims priority under 35 U.S.C. §119(a) of Korean Patent Application No. 10-2011-0070071, filed on Jul. 14, 2011, which is incorporated by reference in its entirety.

BACKGROUND

1. Technical Field

The following description relates to an image processing method, an image processor, and a stereoscopic image display device using the image processor, which obtain high readability on a text area when implementing stereoscopic images (hereinafter, referred as "three-dimensional (3D) images") by a patterned retarder method.

2. Discussion of the Related Art

Techniques for implementing a stereoscopic image display device to display three-dimensional (3D) images are classified as either a stereoscopic technique or an autostereoscopic technique. Generally, a stereoscopic technique creates or enhances the illusion of depth in an image by presenting two offset images separately to the left eye and the right eye of the user viewing the 3D image and requires the use of glasses to view the 3D image. The stereoscopic technique uses a binocular parallax image between the left and right eyes of a viewer and includes a glasses method and a non-glasses method. The glasses method is classified into a patterned retarder method (hereinafter, referred to as a "PR type") and a shutter glasses method. In the PR type, a three-dimensional (3D) image is implemented by using polarization glasses after displaying the binocular parallax image on a direct view-based display device or a projector by changing polarization direction. In the shutter glasses method, a 3D image is implemented by using liquid crystal shutter glasses after displaying the binocular parallax image on a direct view-based display device or a projector in a time division manner. In the non-glasses method, a 3D image is implemented by using an optical plate such as a parallax barrier or a lenticular lens for separating an optical axis of the binocular parallax image.

FIG. 1 illustrates an exploded perspective view of a conventional PR type stereoscopic image display device. With reference to FIG. 1, the PR type stereoscopic image display device implements the 3D image using a polarization characteristic of a patterned retarder PR disposed on a display panel DIS and polarization characteristic of polarized glasses PG which a user wears. The PR type stereoscopic image display device displays a left-eye image on odd-numbered lines of the display panel DIS and displays a right-eye image on even-numbered lines of the display panel DIS. The left-eye image is converted into left-circularly polarized light by the patterned retarder PR. The right-eye image is converted into right-circularly polarized light by the patterned retarder PR. A left eye polarizing filter of the polarized glasses PG passes through only the left-circularly polarized light, and a right eye polarizing filter of the polarized glasses PG passes through only the right-circularly polarized light. Therefore, the user views only the left-eye image through his or her left eye and views only the right-eye image through his or her right eye.

In case of the PR type stereoscopic image display device, a boundary portion of the 3D image such as between an object and another object or between an object and a background may be unevenly shown, for example, in steps. Such a phenomenon is known as "jagging," "jagness," or a "zigzag artifact." In the following description, a shape in a 3D image that looks like a step pattern is referred to as "jagging."

Meanwhile, the 3D image may include a text area which displays texts. The text area of the 3D image may have poor readability due to jagging.

SUMMARY

The embodiments of this application herein relate to an image processing method, an image processor, and a stereoscopic image display device using the image processor.

One object of the embodiments of this application provides an image processing method, an image processor, and a stereoscopic image display device using the image processor which obtains high readability on a text area when implementing both 2D images and 3D images.

To achieve these objects and other advantages and in accordance with the purpose according to one aspect of the invention, an image processing method comprises: (A) converting left-eye image data into left-eye edge data, and right-eye image data into right-eye edge data; (B) extracting left-eye coordinates corresponding to a text area of a left-eye image and right-eye coordinates corresponding to the text area of a right-eye image by analyzing the left-edge data and right-edge data respectively; (C) generating left-eye conversion data by converting a left-eye image data corresponding to the left-eye coordinate into an average of the left-eye image data corresponding to the left-eye coordinate and another left-eye image data adjacent to the left-eye image data corresponding to the left-eye coordinate, and generating right-eye conversion data by converting a right-eye image data corresponding to the right-eye coordinate into an average of the right-eye image data corresponding to the right-eye coordinate and another right-eye image data adjacent to the right-eye image data corresponding to the right-eye coordinate; (D) generating 3D image data by converting the left-eye conversion data and the right-eye conversion data according to a 3D format method.

In one embodiment, the stereoscopic image display device includes an image processor that comprises: an edge converter configured to convert left-eye image data into left-eye edge data, and right-eye image data into right-eye edge data; a text area detector configured to extract left-eye coordinates corresponding to a text area of a left-eye image and right-eye coordinates corresponding to the text area of a right-eye image by analyzing the left-edge data and right-edge data respectively; a data converter configured to generate left-eye conversion data by converting a left-eye image data corresponding to the left-eye coordinate into an average of the left-eye image data corresponding to the left-eye coordinate and another left-eye image data adjacent to the left-eye image data corresponding to the left-eye coordinate, and generate right-eye conversion data by converting a right-eye image data corresponding to the right-eye coordinate into an average of the right-eye image data corresponding to the right-eye coordinate and another right-eye image data adjacent to the right-eye image data corresponding to the right-eye coordinate; a 3D formatter configured to generate 3D image data by converting the left-eye conversion data and the right-eye conversion data according to a 3D format method.

In one embodiment, a stereoscopic image display device comprises: a display panel including scan lines and data lines; an image processor configured to supply converted 3D image data by detecting a text area of an image and improving readability of the text area; a data driver configured to convert the converted 3D image data into data voltages and supply the data voltages to the data lines; and a gate driver configured to sequentially supply gate pulses synchronized with the data voltage to the gate lines, wherein the image processor includes: an edge converter configured to convert left-eye image data into left-eye edge data, and right-eye image data into right-eye edge data; a text area detector configured to extract left-eye coordinates corresponding to a text area of a left-eye image and right-eye coordinates corresponding to the text area of a right-eye image by analyzing the left-edge data and right-edge data respectively; a data converter configured to generate left-eye conversion data by converting a left-eye image data corresponding to the left-eye coordinate into an average of the left-eye image data corresponding to the left-eye coordinate and another left-eye image data adjacent to the left-eye image data corresponding to the left-eye coordinate, and generate right-eye conversion data by converting a right-eye image data corresponding to the right-eye coordinate into an average of the right-eye image data corresponding to the right-eye coordinate and another right-eye image data adjacent to the right-eye image data corresponding to the right-eye coordinate; a 3D formatter configured to generate 3D image data by converting the left-eye conversion data and the right-eye conversion data according to a 3D format method.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 3 illustrates an exploded perspective view of a display panel, a patterned retarder, and the polarization glasses of the stereoscopic image display device according to one embodiment.

FIG. 5 illustrates a flow chart of an image processing method in a 3D mode according to one embodiment.

FIG. 10 illustrates a chart of an example of a 3D format method according to one embodiment.

FIG. 11 illustrates a chart of an example of a 3D format method according to one embodiment.

DETAILED DESCRIPTION

Figure 1:
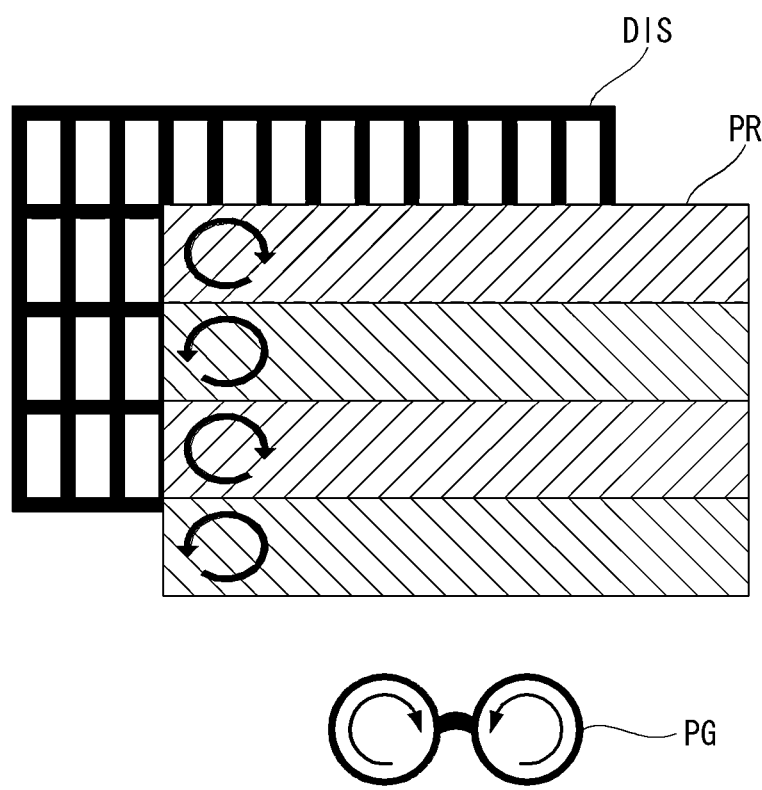
FIG. 1 illustrates an exploded perspective view of a conventional PR type stereoscopic image display device.
Figure 2:
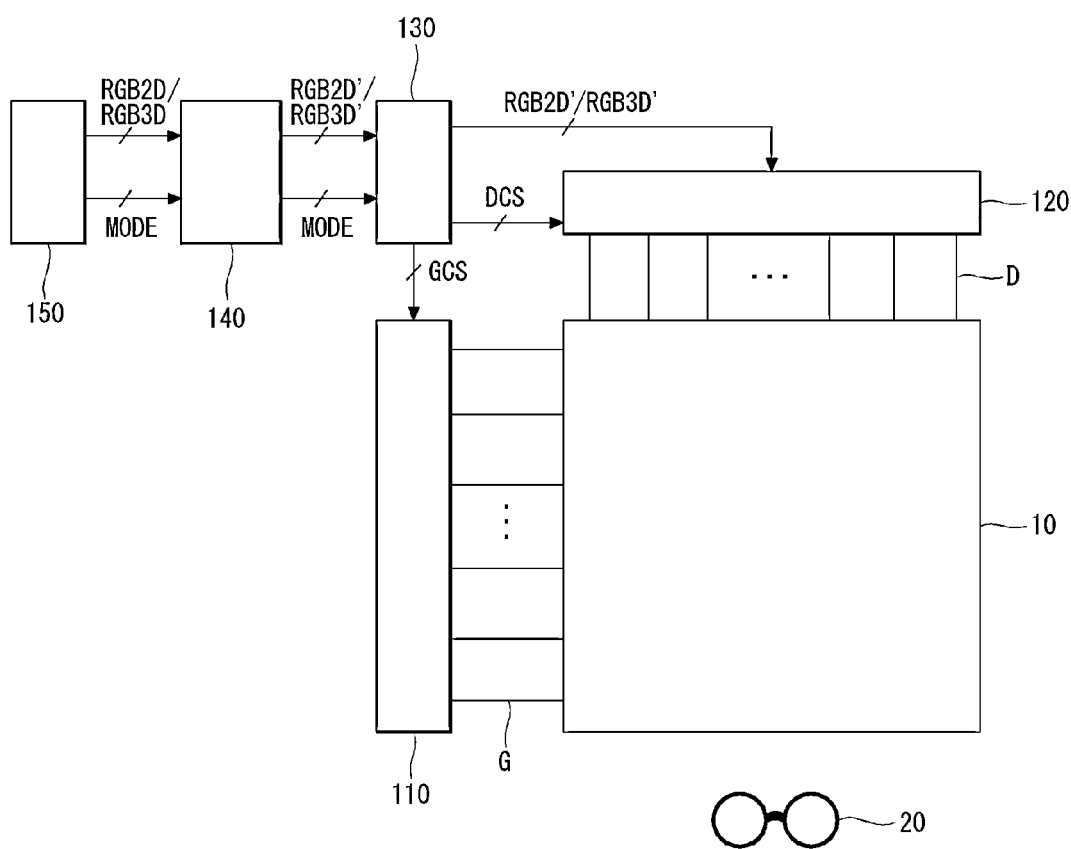
FIG. 2 illustrates a block diagram schematic of a stereoscopic image display device according to one embodiment.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted FIG. 2 illustrates a block diagram schematic of a stereoscopic image display device according to one embodiment. FIG. 3 illustrates one embodiment of an exploded perspective view of a display panel, a patterned retarder, and polarization glasses of the stereoscopic image display device. The stereoscopic image display device according to one embodiment may be implemented as a flat panel display such as a liquid crystal display (LCD), a field emission display (FED), a plasma display panel (PDP) display, and an organic light emitting diode (OLED) display. In the following description, the liquid crystal display (LCD) is described as an example of the stereoscopic image display device. However, embodiments of this application are not limited thereto. For example, other kinds of flat panel display, such as FED, PDP, and OLED, may be used.

With reference to FIGS. 2 and 3, the stereoscopic image display device according to an embodiment includes a display panel 10, polarization glasses 20, a gate driver 110, a data driver 120, a timing controller 130, an image processor 140, and a host system 150.

The display panel 10 includes a thin film transistor (TFT) substrate and a color filter substrate (not shown). A liquid crystal layer (not shown) is formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G transfers a data voltage supplied via the data line D to a pixel electrode of the liquid crystal cell in response to a gate pulse supplied through the gate line G. A common voltage is supplied to a common electrode. Each of the pixels is driven by an electric field between the pixel electrode and the common electrode.

A color filter array (not shown), including a black matrix and a color filter, is formed on the color filter substrate. The common electrode is formed on the color filter substrate in a vertical electric field driving manner, such as a twisted nematic (TN) mode and a vertical alignment (VA) mode. The common electrode is formed on the TFT substrate along with the pixel electrode in a horizontal electric field driving manner, such as an in-plane switching (IPS) mode and a fringe field switching (FFS) mode. The display panel 10 may be implemented in any liquid crystal mode such as the TN, VA, IPS, and FFS modes.

The display panel 10 may be implemented as a transmissive type liquid crystal panel modulating light from a backlight unit (not shown). The backlight unit includes a plurality of light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

With reference to FIG. 3, an upper polarizing plate 11A is attached to the color filter substrate and a lower polarizing plate 11B is attached to the TFT substrate. Alignment layers for setting pre-tilt angles of liquid crystals are respectively formed on the TFT substrate and the color filter substrate. A spacer (not shown) is formed between the TFT substrate and the color filter substrate to maintain a cell gap of the liquid crystal layer.

The display panel 10 displays a two-dimensional (2D) image on odd-numbered lines and even-numbered lines thereof in a 2D mode. The display panel 10 displays a left-eye or a right-eye image on the odd-numbered lines and displays a right-eye or left-eye image on the even-numbered lines in a three-dimensional (3D) mode. The image displayed on the display panel 10 is incident on a patterned retarder 30 disposed on the display panel 10 through the upper polarizing plate 11A.

The patterned retarder 30 includes first retarders 31 formed on the odd-numbered lines of the patterned retarder 30 and second retarders 32 formed on the even-numbered lines of the patterned retarder 30. The first retarders 31 may be positioned opposite the odd-numbered lines of the display panel 10 and the second retarders 32 may be positioned opposite to the even-numbered lines of the display panel 10. The first retarders 31 may convert the light incident from the display panel 10 into a first circularly polarized light (for example, a left circularly-polarized light). The second retarders 32 may convert the light incident from the display panel 10 into a second circularly polarized light (for example, a right circularly-polarized light). Meanwhile, the patterned retarder 30 may include a black stripe for widening a vertical viewing angle.

The polarization glasses 20 include a left-eye polarization filter $F_L$ through which the first circularly polarized light converted by the first retarders 31 passes and a right-eye polarization filter $F_R$ through which the second circularly polarized light converted by the second retarders 32 passes. For example, the left-eye polarization filter $F_L$ can pass through the left circularly-polarized light, and the right-eye polarization filter $F_R$ can pass through the right circularly-polarized light.

In the example PR (patterned retarder) type stereoscopic image display device, the display panel 10 may display the left image on the odd-numbered lines of the first retarders 31 of the patterned retarder 30, and may convert the left image into the first circularly-polarized light. The left-eye polarization filter $F_L$ may pass through the first circularly-polarized light. Thus, a user may view only a left image through his or her left eye. Also, the display panel 10 may display the right image on the even-numbered lines of the second retarders 32 of the patterned retarder 30, and may convert the right image into the second circularly-polarized light. Also, the right-eye polarization filter $F_R$ may pass through the second circularly-polarized light. Thus, a user may view only right image through his or her right eye.

The data driver 120 may include a plurality of source driver integrated circuits (ICs) (not shown). The source driver ICs may receive converted 2D image data RGB2D' or converted 3D image data RGB3D' from the timing controller 130. The source driver ICs may convert the converted 2D image data RGB2D' or the converted 3D image data RGB3D' received from the timing controller 130 into positive or negative polarity gamma compensation voltage. The source driver ICs may supply the positive and negative analog data voltages to the data lines D of the display panel 10.

The gate driver 110 may sequentially supply gate pulses synchronized with the data voltage to the gate lines G of the display panel 10 under the control of the timing controller 130. The gate driver 110 may include a plurality of gate driver ICs (not shown). Each of the gate driver ICs may include a shift register, a level shifter for converting an output signal of the shift register into a signal having a swing width suitable for a TFT drive of the liquid crystal cell, an output buffer, and the like.

The timing controller 130 may receive converted 2D image data RGB2D' or the converted 3D image data RGB3D', timing signals, and a mode signal MODE from the image processor 140. The timing controller 130 may generate a gate control signal GCS for controlling the gate driver 110 and a data control signal DCS for controlling the data driver 120, based on the converted 2D image data RGB2D' or the converted 3D image data RGB3D', the timing signals, and the mode signal MODE. The timing signals may include a vertical synchronization signal, a horizontal synchronization signal, a data enable signal, a dot clock, etc. The timing controller 130 may output the gate control signal GCS to the gate driver 110. The timing controller 130 may output the converted 2D image data RGB2D' or the converted 3D image data RGB3D' and the data control signal DCS to the data driver 120.

The host system 150 supplies original 2D image data RGB2D or original 3D image data RGB3D to the image processor 140 through an interface such as a low voltage differential signaling (LVDS) interface or a transition minimized differential signaling (TMDS) interface. Furthermore, the host system 150 may supply the timing signals and the mode signal MODE, for distinguishing the 2D mode from the 3D mode, to the image processor 140.

The image processor 140 receives the original 2D image data RGB2D from the host system 150 in the 2D mode. The image processor 140 converts the original 2D image data RGB2D and outputs the converted 2D image data RGB2D' to the timing controller 130 in the 2D mode. The image processor 140 receives the original 3D image data RGB3D from the host system 150 in the 3D mode. The image processor 140 converts the original 3D image data RGB3D and outputs the converted 3D image data RGB3D' to the timing controller 130.

The image processor 140 and the image processing method in the 3D mode according to the embodiment will be described in detail with reference to FIGS. 4 and 5.

Figure 4:
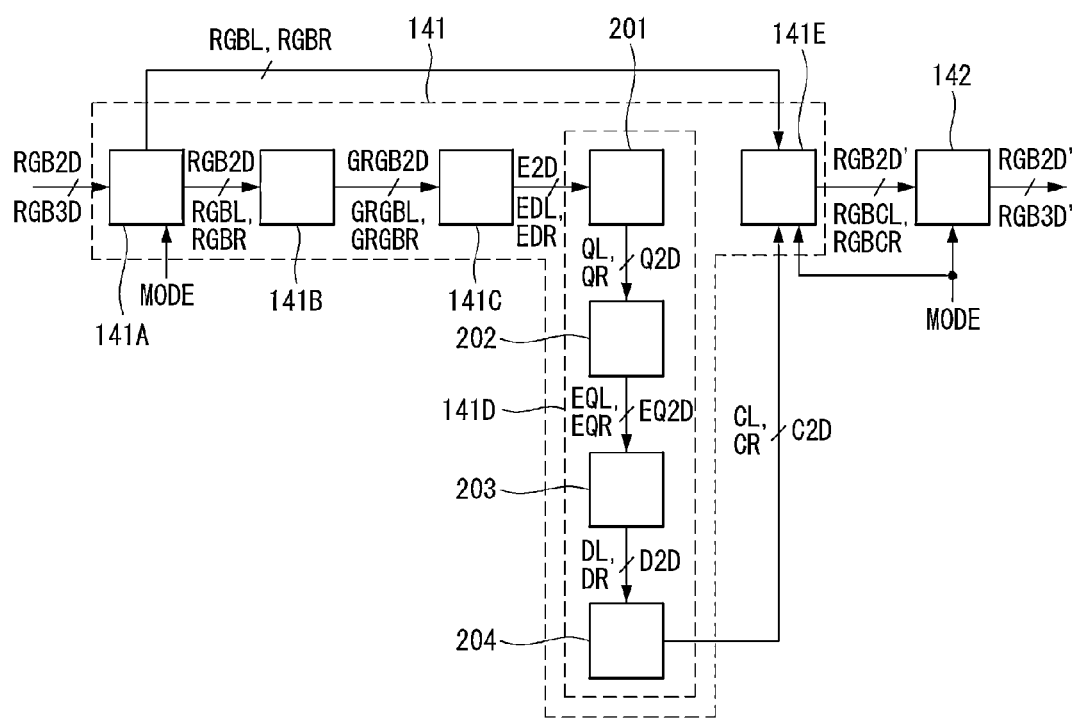
FIG. 4 illustrates a block diagram of an image processor of the stereoscopic image display device according to one embodiment.

FIG. 4 illustrates a block diagram of the image processor 140 shown in FIG. 2. FIG. 5 illustrates a flow chart of an image processing method in a 3D mode according to one embodiment. With reference to FIG. 4, the image processor 140 includes a text processor 141 and a 3D formatter 142. The text processor 141 includes a data expansion unit 141A, a gray scale converter 141B, an edge data converter 141C, a text area detector 141D, and a data converter 141E. The text processor 141 improves readability of a text area after detection of the text area by analyzing the original 3D image data RGB3D in the 3D mode. The 3D formatter 142 converts image data of which readability is improved from the text processor 141 according to a 3D format method. In one embodiment, a text area describes an area of an image that comprises text.

The data expansion unit 141A receives the original 3D image data RGB3D including original left-eye image data and original right-eye image data from host system 150. The data expansion unit 141A receives the mode signal MODE and the timing signals from host system 150. The data expansion unit 141A may distinguish the 2D mode from the 3D mode according to the mode signal MODE.

Figure 6A:
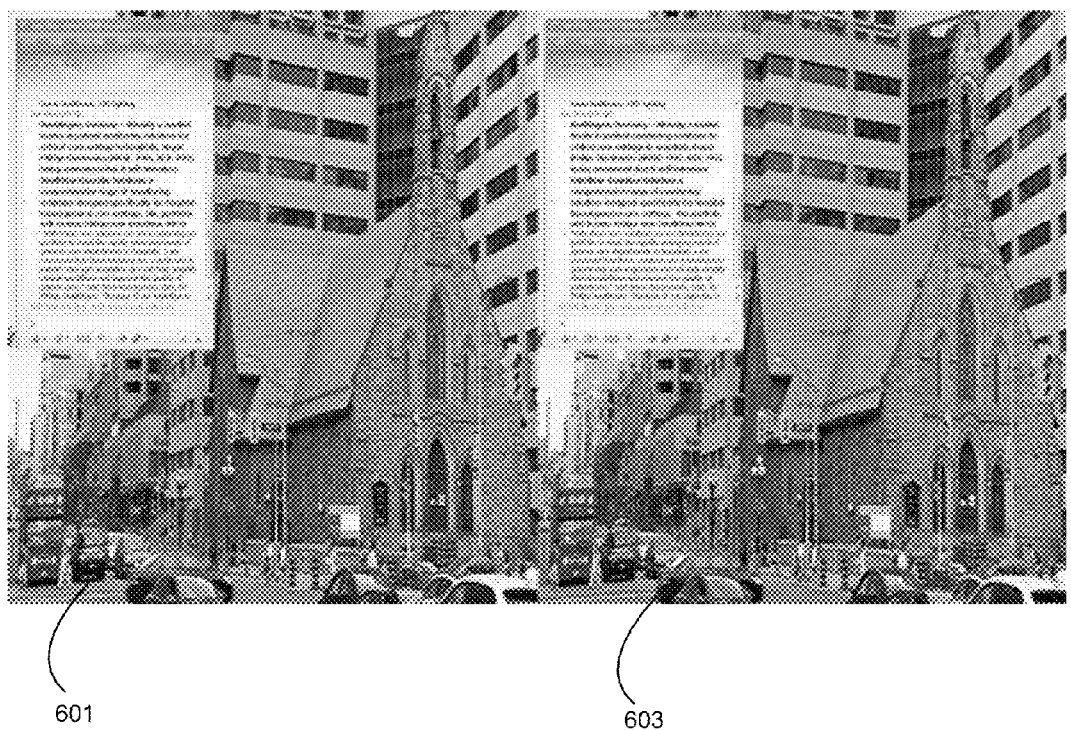
FIG. 6A illustrates a screen shot of an input 3D image according to one embodiment.

The original 3D image data RGB3D includes the original left-eye image data and the original right-eye image data which are input side by side. FIG. 6A illustrates a screen shot of an input 3D image according to one embodiment. As shown in FIG. 6A, the original 3D image data RGB3D may include the original left-eye image data which is represented by the left half side 601 of the image and the original right-eye image data which is represented by the right half side 603 of the image. In another embodiment, the original 3D image data RGB3D may include the original left-eye image data which is represented by the top half side of the image and the original right-eye image data which is represented by the bottom half side of the image. In the 3D mode, the data expansion unit 141A generates left-eye image data RGBL of one frame by expanding the original left-eye image data, and right-eye image data RGBR of one frame by expanding the original right-eye image data. (See S101 in FIG. 5.)

The gray scale converter 141B converts the left-eye image data RGBL into left-eye gray scale data GRGBL. The gray scale converter 141B converts the right-eye image data RGBR into right-eye gray scale data GRGBR. In one embodiment, the gray scale converter 141B uses equation 1 for the conversion of the left-eye image data RGBL and the right-eye image data RGBR.

$$GRGBL=0.114 \times RL+0.587 \times GL+0.299 \times BL$$

$$GRGBR=0.114 \times RR+0.587 \times GR \pm 0.99 \times BR \quad \text{[Equation 1]}$$

In equation 1, GRGBL indicates the left-eye gray scale data, and RL indicates red data of the left-eye image data RGBL. GL indicates green data of the left-eye image data RGBL, and BL indicates blue data of the left-eye image data RGBL. GRGBR indicates the right-eye gray scale data, and RR indicates red data of the right-eye image data RGBR. GR indicates green data of the right-eye image data RGBR, and BR indicates blue data of the right-eye image data RGBR. Each of the left-eye image data RGBL and the right-eye image data RGBR includes red data, green data, and blue data.

Figure 6B:
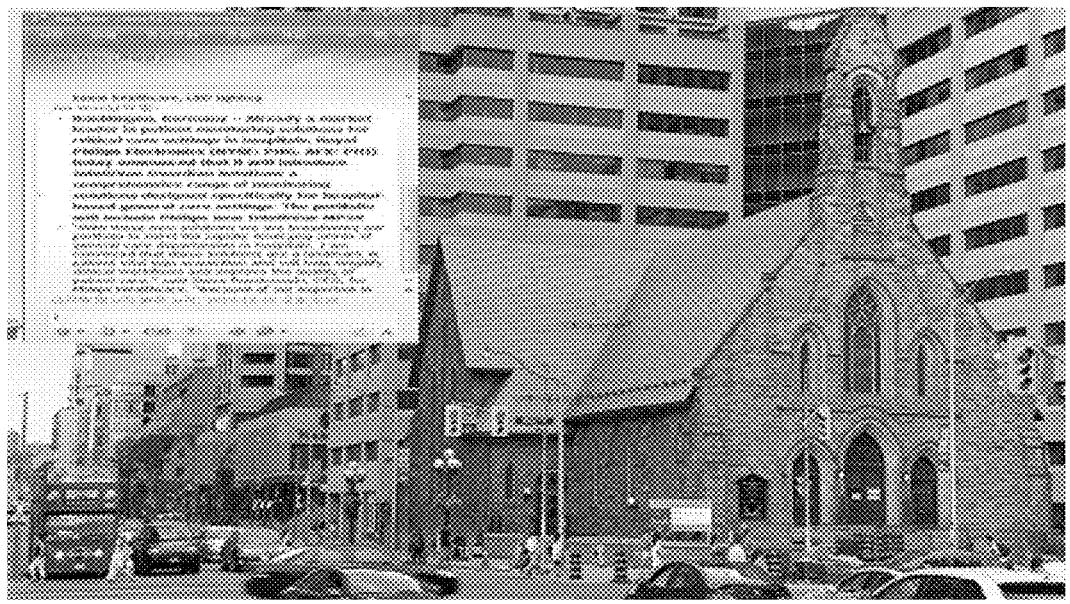
FIG. 6B illustrates a screen shot of a left-eye image according to one embodiment.
Figure 6C:
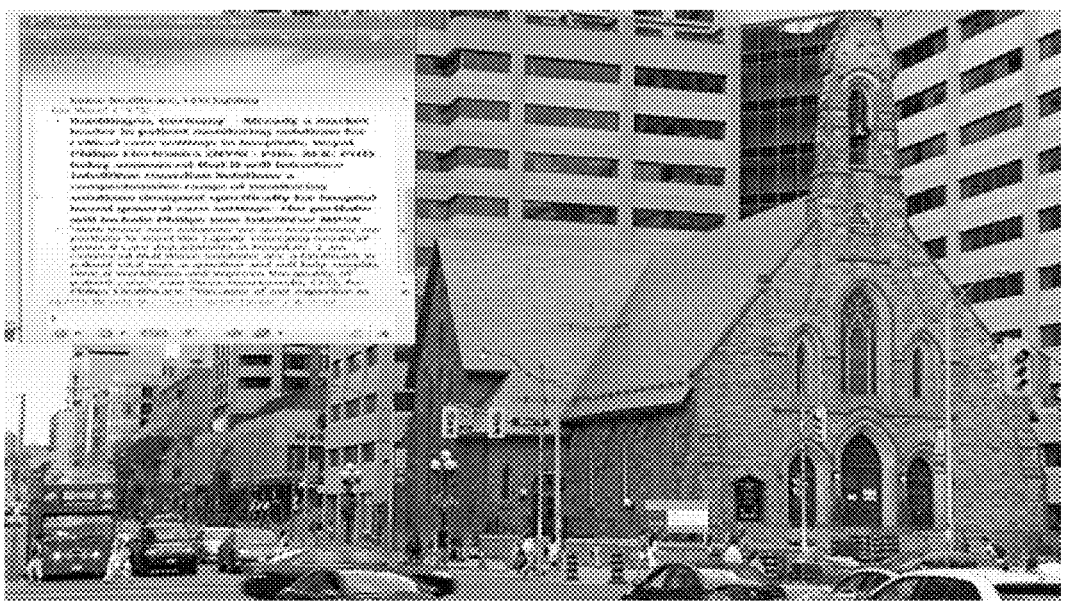
FIG. 6C illustrates a screen shot of a left-eye gray scale image according to one embodiment.

FIG. 6B illustrates a screen shot of a left-eye image according to one embodiment of this application, and FIG. 6C illustrates a screen shot of a left-eye gray scale image according to one embodiment of this application. With reference to FIGS. 6B and 6C, the left-eye image is an image obtained from the left-eye image data RGBL, and the left-eye gray scale image is an image obtained from the left-eye gray scale data GRGBL. Also, the gray scale converter 141B may eliminate noise in the left-eye gray scale image by applying a noise elimination filter such as applying a median filter to the left-eye gray scale data GRGBL. The gray scale converter 141B may similarly eliminate noises of the right-eye gray scale image by applying the noise elimination filter to the right-eye gray scale data GRGBR. (See S102 in FIG. 5.)

The edge converter 141C may convert the left-eye gray scale data GRGBL into left-eye edge data EDL, and the right-eye gray scale data GRGBR into right-eye edge data EDR. The edge converter 141C may use an edge conversion algorithm such as a sobel mask (operator) method in order to convert the left-eye gray scale data GRGBL into left-eye edge data EDL and the right-eye gray scale data GRGBR to right-eye edge data EDR. (See S103 in FIG. 5.)

The text area detector 141D detects the text area in the image by analyzing the left edge data EDL and the right edge data EDR. In one embodiment, the text area detector 141D includes a quantization processor 201, a text area expansion unit 202, a text area processor 203, and a coordinate extractor 204.

The quantization processor 201 quantizes each of the left-eye edge data EDL and the right-eye edge data EDR by using a quantization method. The quantization processor 201 may generate left-eye quantization data QL by converting the left-eye edge data EDL into a maximum gray level value if the left-eye edge data EDL is greater than a first threshold value (edge data threshold value). The quantization processor 201 may convert the left-eye edge data EDL into a minimum gray level value if the left-eye edge data EDL is less than or equal to the first threshold value. Similarly, the quantization processor 201 may generate right-eye quantization data QR by converting the right-eye edge data EDR into the maximum gray level value if the right-eye edge data EDR is greater than the first threshold value. The quantization processor 201 may convert the right-eye edge data EDR into the minimum gray level value if the right-eye edge data EDR is less than or equal to the first threshold value. The quantization processor 201 may output the left-eye quantization data QL and the right-eye quantization data QR to the text area expansion unit 202 after the quantization method is complete.

Figure 6D:
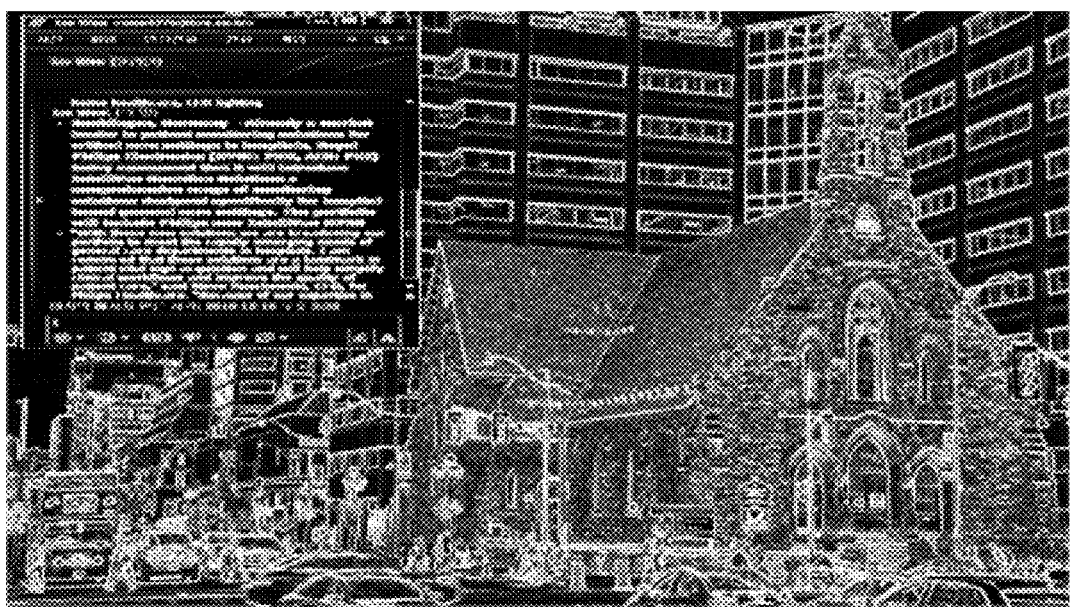
FIG. 6D illustrates a screen shot of a left-eye edge image according to one embodiment.
Figure 6E:
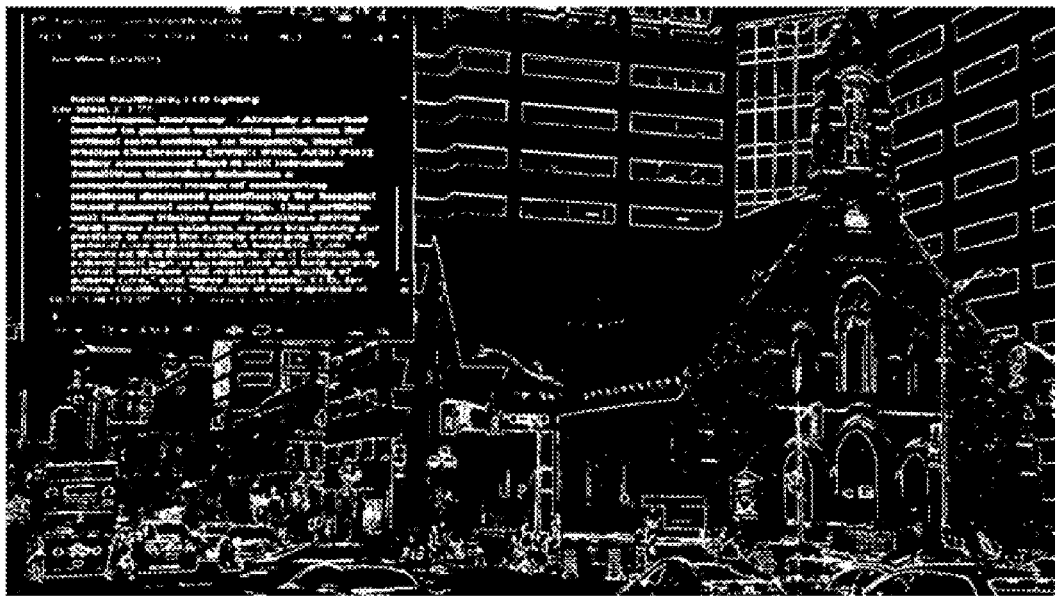
FIG. 6E illustrates a screen shot of a left-eye quantization image according to one embodiment.

FIG. 6D illustrates a screen shot of a left-eye edge image according to one embodiment. FIG. 6E illustrates a screen shot of a left-eye quantization image according to one embodiment. With reference to FIGS. 6D and 6E, the left-eye edge image may be obtained from the left-eye edge data EDL and the left-eye quantization image may be obtained from the left-eye quantization data QL. Also, each of the left-eye edge image and the left-eye quantization image may be represented as gray level values from "G0" to "G255" when input image data is 8 bits in one embodiment. In one example, the maximum gray level value may be associated with a gray level value "G255" and the minimum gray level value may be associated with a gray level value "G0". As shown in FIGS. 6D and 6E, edges of the left quantization image (or a right quantization image) in FIG. 6E are clearer than those of the left-eye edge image (or the right-eye edge image) in FIG. 6D due to the quantization method.

As shown in FIG. 4, the text area expansion unit 202 receives the left-eye quantization data QL and the right-eye quantization data QR from the quantization processor 201. The text area expansion unit 202 converts the left-eye quantization data QL and the right-eye quantization data QR into left-eye quantization expansion data EQL and right-eye quantization expansion data EQR while shifting a first mask M1 with a mask size.

The text area expansion unit 202 sets the first mask M1 on each of the left-eye quantization data QL and the right-eye quantization data QR. In one embodiment, the text area expansion unit 202 converts all of the left-eye quantization data QL or all of the right-eye quantization data QR included in the first mask M1 into the maximum value among all of the left-eye quantization data QL or the maximum value among all of the right-eye quantization data QR included in the first mask M1. The text area expansion unit 202 performs the conversion while shifting the first mask M1 with a mask size. The first mask M1 may be a horizontal mask which has a size of 1×t wherein t is a natural number greater than 2.

Figure 7A:
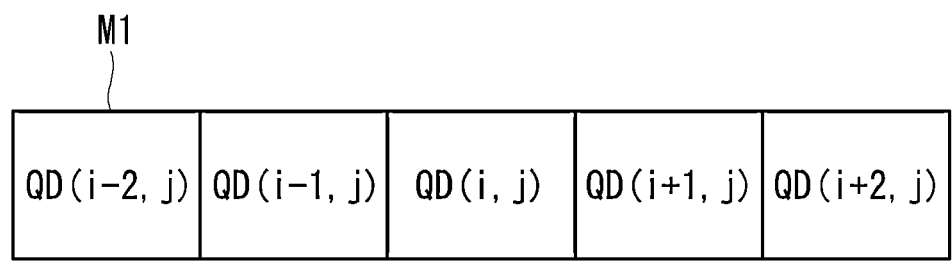
FIG. 7A illustrates a first mask according to one embodiment.

FIG. 7A illustrates a first mask according to one embodiment. For example, the first mask M1 may have a size of 1×5 as shown in FIG. 7A. The text area expansion unit 202 converts all of the left-eye quantization data QL (QD(i−2,j), QD(i−1,j), QD(i,j), QD(i+1,j), QD(i+2,j) (or all of the right-eye quantization data QR)) included in the first mask M1 into the maximum value among all of the left-eye quantization data QL (QD(i−2,j), QD(i−1,j), QD(i,j), QD(i+1,j), QD(i+2,j) (or all of the right-eye quantization data QR)) included in the first mask M1. QD(i,j) indicates the left-eye quantization data of coordinate (i,j). "i" is a natural number greater than or equal to 1 and less than or equal to m which is a horizontal resolution of the display panel 10, and "j" is a natural number greater than or equal to 1 and less than or equal to n which is a vertical resolution of the display panel 10. The left-eye quantization data QL or the right-eye quantization data QR has the maximum gray level value or the minimum gray level value. Therefore, the text area expansion unit 202 converts all of the left-eye quantization data QL (QD(i−2,j), QD(i−1,j), QD(i,j), QD(i+1,j), QD(i+2,j) (or all of the right-eye quantization data QR)) included in the first mask M1 into the maximum gray level value if one of the left-eye quantization data QL (QD(i−2,j), QD(i−1,j), QD(i,j), QD(i+1,j), QD(i+2,j) (or the right-eye quantization data QR)) is a maximum gray level value. Also, the text area expansion unit 202 converts all of the left-eye quantization data QL (QD(i−2,j), QD(i−1,j), QD(i,j), QD(i+1,j), QD(i+2,j) (or all of the right-eye quantization data QR) included in the first mask M1 into the minimum gray level value if one of the left-eye quantization data QL (QD(i−2,j), QD(i−1,j), QD(i,j), QD(i+1,j), QD(i+2,j) (or all of the right-eye quantization data QR)) is a minimum gray level value. The text area expansion unit 202 outputs left-eye quantization expansion data EQL and right-eye quantization expansion data EQR to the text area processor 203.

Figure 8A:
FIG. 8A illustrates a screen shot of a left-eye quantization image including a detailed view of the text area according to one embodiment.
Figure 8B:
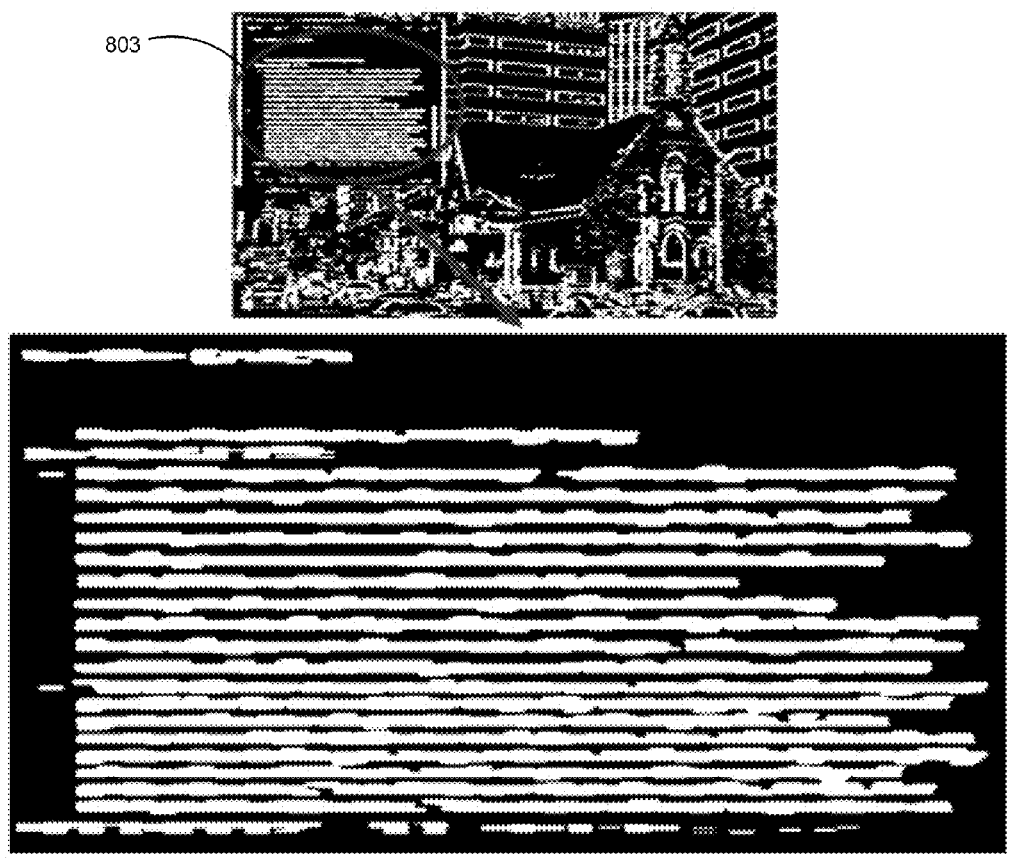
FIG. 8B illustrates a screen shot of a left-eye text area expansion image according to one embodiment.

FIG. 8A illustrates a screen shot of a left-eye quantization image including a detailed view of the text area according to one embodiment. FIG. 8B illustrates a screen shot of a left-eye quantization expansion image according to one embodiment. With reference to FIGS. 8A and 8B, the left-eye quantization image shown in FIG. 8A illustrates an image obtained from the left-eye quantization data QL. The left-eye quantization expansion image shown in FIG. 8B illustrates an image obtained from the left-eye quantization expansion data EQL. In FIGS. 8A and 8B, the text area 801 of the left-eye quantization image and the text area 803 of the left-eye quantization expansion image respectively are enlarged. The text area 801 of the left-eye quantization image and the text area 803 of the left-eye quantization expansion image are respectively represented as a white gray level. On the text area 801 of the left-eye quantization image, texts are represented as the white gray level, but spaces between texts are represented as a black gray level. On the text area 803 of the left-eye quantization expansion image, texts and spaces between the texts are represented as the white gray level. That is, the text area expansion unit 202 represents spaces between texts as the white gray level in order to detect the text area correctly in the next step. The white gray level is a gray level obtained from the maximum gray level value, and the black gray level is a gray level obtained from the minimum gray level value.

Referring back to FIG. 4, the text area processor 203 receives the left-eye quantization expansion data EQL and the right-eye quantization expansion data EQR. The text area processor 203 converts the left-eye quantization expansion data EQL and the right-eye quantization expansion data EQR into left-eye detection data DL and right-eye detection data DR while shifting a second mask M2 with a mask size and a third mask M3 with a mask size.

The text area processor 203 sets the second mask M2 on the left-eye quantization expansion data EQL and the right-eye quantization expansion data EQR respectively. The text area processor 203 decides whether or not all of the left-eye quantization expansion data EQL or all of the right-eye quantization expansion data EQR included in the second mask M2 have the maximum gray level value. The text area processor 203 maintains all of the left-eye quantization expansion data EQL or all of the right-eye quantization expansion data EQR included in the second mask M2 if all of the left-eye quantization expansion data EQL or the right-eye quantization expansion data EQR included in the second mask M2 have the maximum gray level value. The text area processor 203 converts all of the left-eye quantization expansion data EQL or all of the right-eye quantization expansion data EQR included in the second mask M2 into the minimum gray level value if any one of the left-eye quantization expansion data EQL or any one of the right-eye quantization expansion data EQR included in the second mask M2 has a minimum gray level value. The text area processor 203 performs the conversion while shifting the second mask M2 with a mask size. The second mask M2 may be a horizontal mask which has a size of 1×u wherein u is a natural number greater than 2.

The text area processor 203 sets the third mask M3 on the left-eye quantization expansion data EQL and the right-eye quantization expansion data EQR respectively. The text area processor 203 decides whether or not all of the left-eye quantization expansion data EQL or all of the right-eye quantization expansion data EQR included in the third mask M3 have the maximum gray level value. The text area processor 203 maintains all of the left-eye quantization expansion data EQL or all of the right-eye quantization expansion data EQR included in the third mask M3 if all of the left-eye quantization expansion data EQL or all of the right-eye quantization expansion data EQR included in the third mask M3 has the maximum gray level value. The text area processor 203 converts all of the left-eye quantization expansion data EQL or all of the right-eye quantization expansion data EQR included in the third mask M3 into minimum gray level value if any one of the left-eye quantization expansion data EQL or any one of the right-eye quantization expansion data EQR included in the third mask M3 has a minimum gray level value. The text area processor 203 performs the conversion by shifting the third mask M3 as a mask size. The third mask M3 may be a vertical mask which has a size of v×1 wherein v is a natural number greater than 2.

Also, the text area processor 203 may perform post processing to account for errors in the text area. The text area processor 203 may convert the left-eye quantization expansion data EQL or the right-eye quantization expansion data EQR adjacent to the second mask M2 or the third mask M3 into the maximum gray level value. For example, the text area processor 203 may convert the left-eye quantization expansion data EQL or the right-eye quantization expansion data EQR which exists in a half size of the second mask M2 at regions adjacent to the second mask M2 into the maximum gray level value. The text area processor 203 may convert the left-eye quantization expansion data EQL or the right-eye quantization expansion data EQR which exists in a half size of the second mask M3 at regions adjacent to the second mask M3 into maximum gray level value.

Figure 7B:
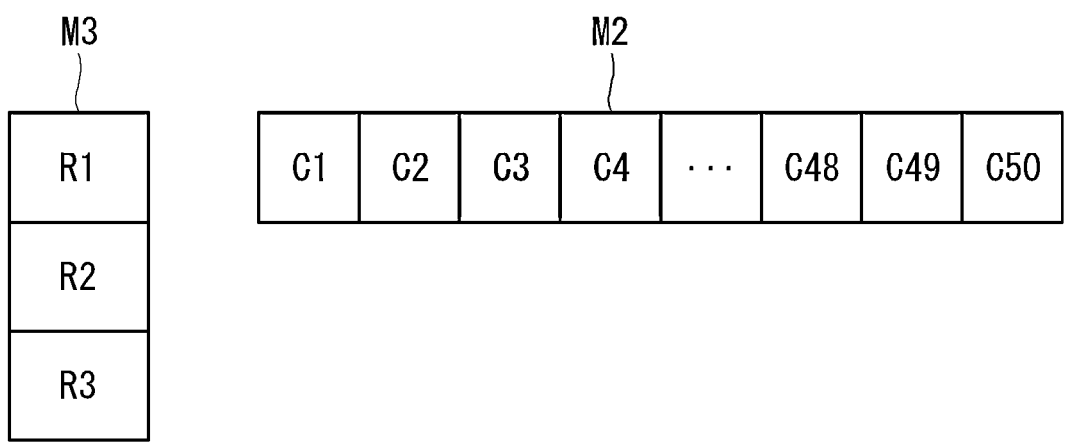
FIG. 7B illustrates a second mask and a third mask according to one embodiment.

FIG. 7B illustrates a second mask and a third mask according to one embodiment of this application. For example, the second mask M2 may have a size of 1×50 and the third mask M3 have a size of 3×1 as shown in FIG. 7B. The text area processor 203 performs the conversion while shifting the third mask M3 with the mask size after performing the conversion while shifting the second mask M2 as the mask size. The text area processor 203 outputs the left-eye detection data DL and the right-eye detection data DR to the coordinate extractor 204.

Figure 8C:
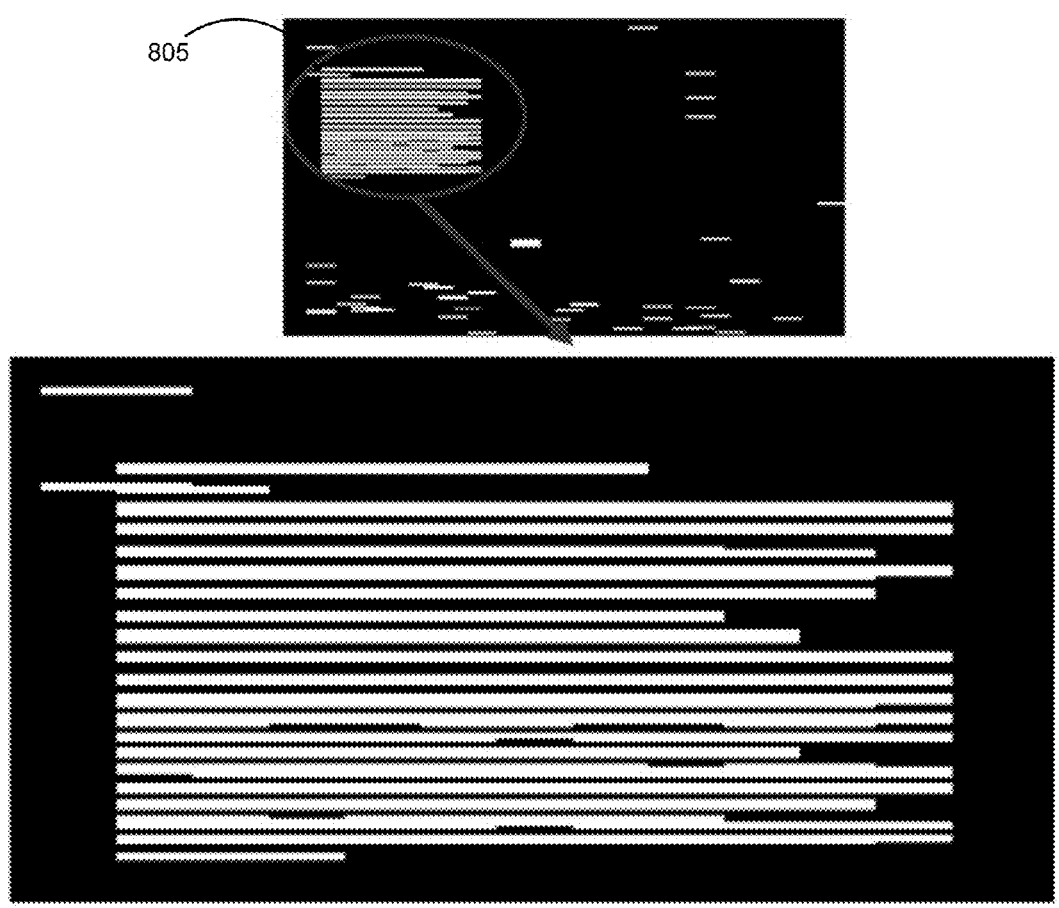
FIG. 8C illustrates a screen shot of a left-eye text area detection image according to one embodiment.

FIG. 8C illustrates a screen shot of a left-eye detection image according to one embodiment. With reference to FIG. 8C, the left-eye detection image is an image obtained from the left-eye detection data DL. In FIG. 8C, the text area 805 of the left-eye detection image is enlarged. The text area 805 of the left-eye detection image is represented as a white gray level. The white gray level is a gray level obtained from the maximum gray level value.

Meanwhile, the text area processor 203 may change a size of the second mask M2 and a size of the third mask M3 according to a complexity of an image. In one embodiment, the complexity of an image is based on the complexity of the lines in the image. The higher the complexity of the image is, the bigger the text area processor 203 applies size of the second mask M2 and the size of the third mask M3.

Figure 9A:
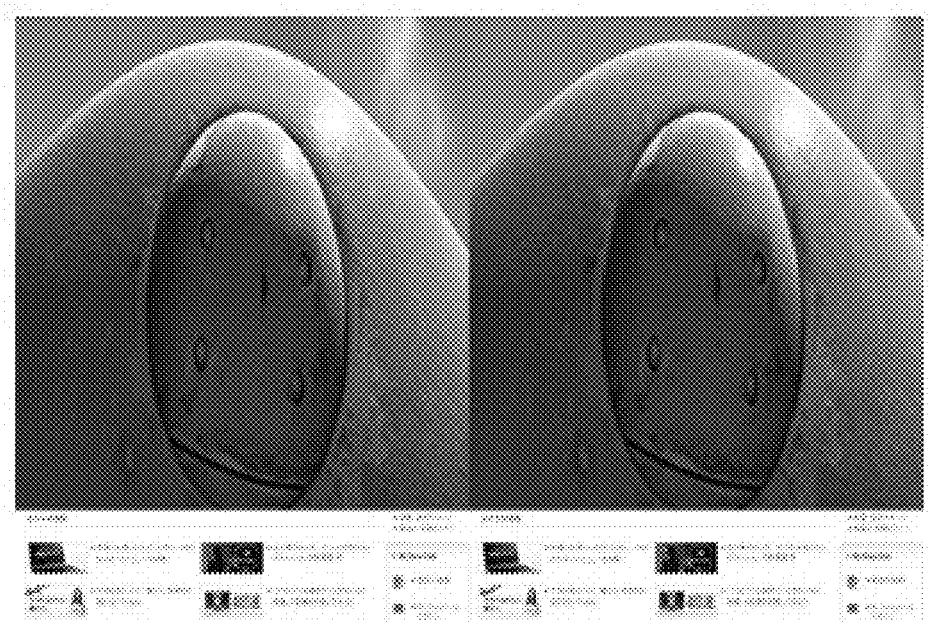
FIG. 9A illustrates a screen shot of a simple 3D image according to one embodiment.
Figure 9B:
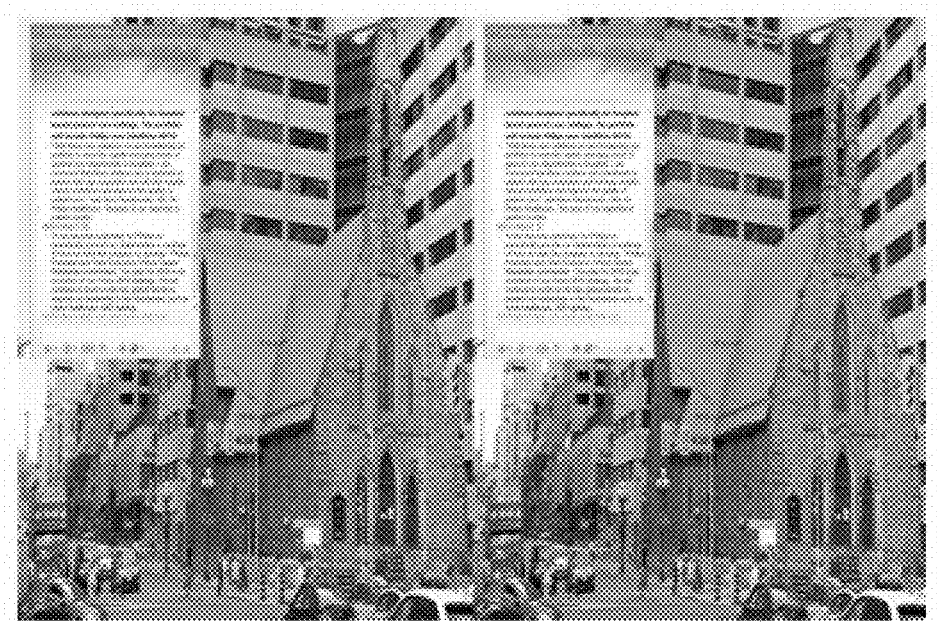
FIG. 9B illustrates a screen shot of a complicated 3D image according to one embodiment.

FIG. 9A illustrates a screen shot of a simple 3D image according to one embodiment of this application. FIG. 9B illustrates a screen shot of a complicated 3D image. With reference to FIGS. 9A and 9B, the complexity of a line is based on the amount of edges on the line. Thus, a complex line has more edges compared to a simple line. Also, a complex image has more complex lines compared to simple images. Therefore, the text area processor 203 may include a complexity calculator 203A for calculating the complexity of the image.

The complexity calculator 203A detects the left-eye quantization data QL that is greater than the second threshold value (edge detection threshold value) as the left edges. The complexity calculator 203A may detect the right-eye quantization data QR that is greater than the second threshold value as the right edges. The complexity calculator 203A calculates a number of complicated lines. The complicated line is defined by the complexity calculator 203A when a number of left edges or a number of right edges in the row line is greater than or equal to a third threshold value (complicated lines threshold value). The complexity calculator 203A may generate a complexity signal having a first logic level if the number of the complicated lines is greater than or equal to a fourth threshold value (complexity detection threshold value). The complexity calculator 203A may generate the complexity signal having a second logic level if the number of the complicated lines is less than the fourth threshold value. That is, the complexity calculator 203A may determine that the image is a complicated image if the number of the complicated lines is greater than or equal to a fourth threshold value. The complexity calculator 203A may determine that the image is a simple image if the number of the complicated lines is less than the fourth threshold value.

The text area processor 203 may choose the second mask M2 having a first size and the third mask M3 having a second size in response to the complexity signal having the first logic level. The text area processor 203 may choose the second mask M2 having a third size and the third mask M3 having a fourth size in response to the complexity signal having the second logic level. The second mask M2 having the first size is bigger than the second mask M2 having the third size. The third mask M3 having the third size is bigger than the third mask M3 having the fourth size.

The coordinate extractor 204 receives the left-eye detection data DL and the right-eye detection data DR from the text area processor 203. The coordinate extractor 204 extracts the left-eye detection data DL having the maximum gray level, and the right-eye detection data DR which have the maximum gray level value. A coordinate of the extracted left-eye detection data is defined as the left-eye coordinate CL and a coordinate of the extracted right-eye detection data is defined as the right-eye coordinate CR. The coordinate extractor 204 outputs the left-eye coordinates CL and the right-eye coordinates CR to the data converter 141E. The left-eye coordinates CL indicates coordinates of the left-eye image data RGBL corresponding to the text area of the left-eye image. The right-eye coordinates CR indicates coordinates of the right-eye image data RGBR corresponding to the text area of the right-eye image. (See S104 in FIG. 5.)

In the 3D mode, the data converter 141E receives the left-eye coordinates CL and the right-eye coordinates CR from the coordinate extractor 204, and receives the left-eye image data RGBL and the right-eye image data RGBR from the data expansion unit 141A. Also, the data converter 141E receives the mode signal MODE from the host system 150. The data converter 141E may distinguish the 2D mode from the 3D mode according to the mode signal MODE. The data converter 141E generates left-eye conversion data RGBCL and right-eye conversion data RGBCR by converting the left-eye image data RGBL corresponding to the left-eye coordinates CL and the right-eye image data RGBR corresponding to the right-eye coordinates CR according to the first or second embodiment of this application. More specifically, the data converter 141E according to the first or second embodiment of this application generates left-eye conversion data RGBCL by converting a left-eye image data corresponding to the left-eye coordinate CL into an average of the left-eye image data corresponding to the left-eye coordinate CL and another left-eye image data adjacent to the left-eye image data corresponding to the left-eye coordinate CL, and right-eye conversion data RGBCR by converting a right-eye image data corresponding to the right-eye coordinate CR into an average of the right-eye image data corresponding to the right-eye coordinate CR and another right-eye image data adjacent to the right-eye image data corresponding to the right-eye coordinate CR.

If the left-eye coordinate CL is a coordinate (a,b), the data converter 141E according to the first embodiment converts the left-eye image data corresponding to the coordinate (a,b) into an average of the left-eye image data corresponding to the coordinate (a,b) and the left-eye image data corresponding to a coordinate (a−1,b). If the right-eye coordinate CL is a coordinate (c,d), the data converter 141E according to the first embodiment of this application converts the right-eye image data corresponding to the coordinate (c,d) into an average of the right-eye image data corresponding to the coordinate (c,d) and the right-eye image data corresponding to a coordinate (c−1,d). Each of "a", "b", "c", and "d" is a natural number, and "a" and "c" is greater than 1.

Alternatively, if the left-eye coordinate CL is the coordinate (a,b), the data converter 141E according to the first embodiment converts the left-eye image data corresponding to the coordinate (a,b) into an average of the left-eye image data corresponding to the coordinate (a,b) and the left-eye image data corresponding to a coordinate (a+1,b). If the right-eye coordinate CL is the coordinate (c,d), the data converter 141E according to the first embodiment converts the right-eye image data corresponding to the coordinate (c,d) into an average of the right-eye image data corresponding to the coordinate (c,d) and the right-eye image data corresponding to a coordinate (c+1,d). Each of "a", "b", "c", and "d" is a natural number.

If the left-eye coordinate CL is the coordinate (a,b), the data converter 141E according to the second embodiment of this application converts the left-eye image data corresponding to the coordinate (a,b) into the average of the left-eye image data corresponding to the coordinate (a,b) and the left-eye image data corresponding to the coordinate (a+1,b) when the left-eye image data of coordinate (a,b) is on an odd line. If the right-eye coordinate CL is the coordinate (c,d), the data converter 141E according to the second embodiment of this application converts the right-eye image data corresponding to the coordinate (c,d) into the average of the right-eye image data corresponding to the coordinate (c,d) and the right-eye image data corresponding to the coordinate (c+1,d) when the right-eye image data corresponding to coordinate (c,d) is on the odd line.

Alternatively, if the left-eye coordinate CL is the coordinate (a,b), the data converter 141E according to the second embodiment converts the left-eye image data corresponding to the coordinate (a,b) into the average of the left-eye image data corresponding to the coordinate (a,b) and the left-eye image data corresponding to the coordinate (a−1,b) when the left-eye image data corresponding to the coordinate (a,b) is on an even line. If the right-eye coordinate CL is the coordinate (c,d), the data converter 141E according to the second embodiment of this application converts the right-eye image data corresponding to the coordinate (c,d) into the average of the right-eye image data corresponding to the coordinate (c,d) and the right-eye image data corresponding to the coordinate (c−1,d) when the right-eye image data corresponding to coordinate (c,d) is on the even line.

The data converter 141E outputs the left-eye conversion data RGBCL and the right-eye conversion data RGBCR to the 3D formatter. Meanwhile, the data converter 141E may convert the left-eye image data RGBL corresponding to the left-eye coordinates CL and the right-eye image data RGBR corresponding to the right-eye coordinates CR according to the first or second embodiment after applying a sharpness filter to improve visibility of the text area to the left-eye image data RGBL corresponding to the left-eye coordinates CL and the right-eye image data RGBR corresponding to the right-eye coordinates CR. The sharpness filter is implemented as a filter well-known in a prior art. (See S105 in FIG. 5.)

The 3D formatter 142 receives the left-eye conversion data RGBCL and the right-eye conversion data RGBCR from the data converter 141E. The 3D formatter 142 receives the mode signal MODE from the host system 150. The 3D formatter may distinguish the 2D mode from the 3D mode according to the mode signal MODE. The 3D formatter 142 generates the converted 3D image data RGB3D' by converting the left-eye conversion data RGBCL and the right-eye conversion data RGBCR according to the 3D format method of the first or second embodiment in the 3D mode.

FIG. 10 illustrates a chart of an example of a 3D format method according to one embodiment. With reference to FIG. 10, the 3D formatter 142 according to the first embodiment generates the converted 3D image data RGB3D' by arranging the left-eye conversion data RGBCL of odd-numbered lines on the odd-numbered lines, the right-eye conversion data RGBCR of even-numbered lines on the even-numbered lines. Alternatively, the 3D formatter 142 generates the converted 3D image data RGB3D' by arranging the left-eye conversion data RGBCL of the even-numbered lines on the odd-numbered lines, and the right-eye conversion data RGBCR of the odd-numbered lines on the even-numbered lines. The 3D formatter 142 supplies the converted 3D image data RGB3D' to the timing controller 130.

FIG. 11 illustrates a chart of an example of a 3D format method according to another embodiment. With reference to FIG. 11, the 3D formatter 142 according to the second embodiment generates the converted 3D image data RGB3D' of a Nth frame by arranging the left-eye conversion data RGBCL of odd-numbered lines on the odd-numbered lines of the Nth frame, the right-eye conversion data RGBCR of even-numbered lines on the even-numbered lines of the Nth frame. Also, the 3D formatter 144 generates the converted 3D image data RGB3D' of a (N+1)th frame by arranging the left-eye conversion data RGBCL of the even-numbered lines on the odd-numbered lines of the (N+1)th frame, and the right-eye conversion data RGBCR of the odd-numbered lines on the even-numbered lines of the (N+1)th frame, wherein N is a natural number. The 3D formatter 142 supplies the converted 3D image data RGB3D' to the timing controller 130. (See S106 in FIG. 5.)

The embodiments described herein convert the left-eye image data RGBL corresponding to the left-eye coordinates CL into an average of the left-eye image data RGBL corresponding to the left-eye coordinates CL and the left-eye image data RGBL adjacent to thereto on the other line. Also, the embodiments described herein convert the right-eye image data RGBR corresponding to the right-eye coordinates CR into an average of the right-eye image data RGBR corresponding to the right-eye coordinates CR and the right-eye image data RGBR adjacent to thereto on the other line. Therefore, the embodiments described herein may compensate for the left-eye conversion data CRGBL or the right-eye conversion data CRGBR which are not arranged on the odd-numbered lines or even-numbered lines. As a result, the embodiments described herein may improve readability of the text area.

Figure 12:
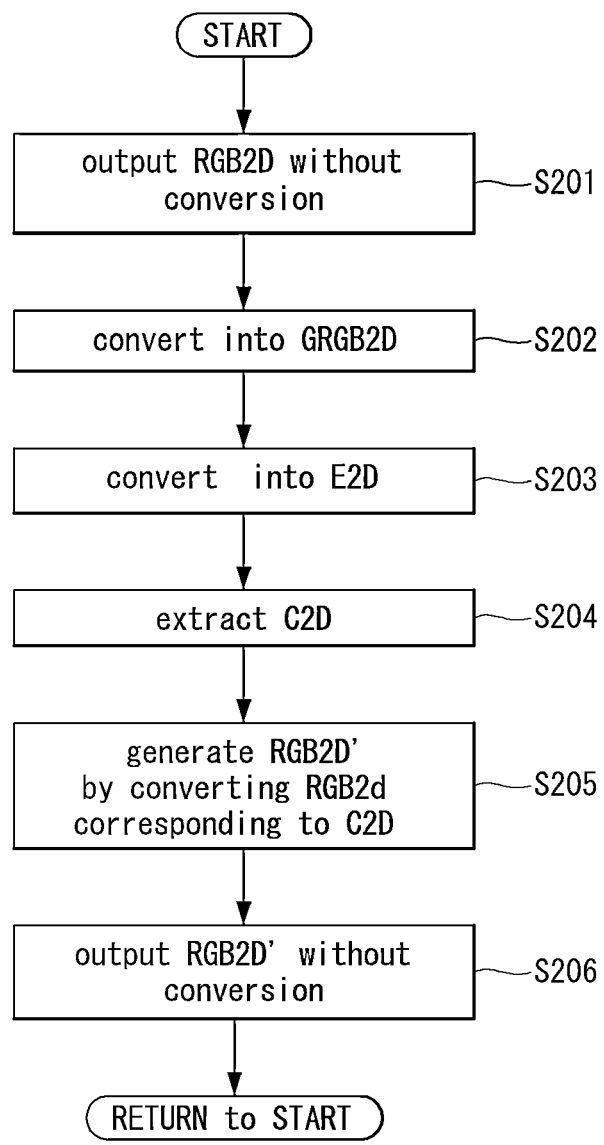
FIG. 12 illustrates a flow chart of an image processing method in a 2D mode according to one embodiment.

The image processor 140 and the image processing method in the 2D mode according to the embodiment of this application are described in detail with reference to FIGS. 4 and 12.

As previously mentioned, FIG. 4 illustrates a block diagram of the image processor shown in FIG. 2. FIG. 12 illustrates a flow chart of an image processing method in the 2D mode according to one embodiment of this application. With reference to FIG. 4, the image processor 140 includes a text processor 141 and a 3D formatter 142. The text processor 141 includes a data expansion unit 141A, a gray scale converter 141B, an edge data converter 141C, a text area detector 141D, and a data converter 141E. The text processor 141 improves readability on a text area after detection of the text area by analyzing the original 2D image data RGB2D in the 2D mode. The 3D formatter 142 outputs image data as it is from the text processor 141 without converting the image data.

The data expansion unit 141A receives the original 2D image data RGB2D and the mode signal MODE from the host system 150. The data expansion unit 141A may distinguish the 2D mode from the 3D mode according to the mode signal MODE. The data expansion unit 141A outputs the original 2D image data RGB2D as it is to the gray scale converter 141B without converting the original 2D image data RGB2D. (See S201 in FIG. 12.)

The gray scale converter 141B converts the original 2D image data RGB2D into 2D gray scale data GRGB2D. The gray scale converter 141B performs the conversion as described in S102 of FIG. 5. (See S202 in FIG. 12.)

The edge converter 141C converts the 2D gray scale data GRGB2D into 2D edge data E2D. The edge converter 141C performs the conversion as described in S103 of FIG. 5. (See S203 in FIG. 12.)

The text area detector 141D includes a quantization processor 201, a text area expansion unit 202, a text area processor 203, and a coordinate extractor 204. The quantization processor 201 generates 2D quantization data Q2D by operating a quantization method which quantizes the 2D edge data E2D. The quantization processor 201 performs the conversion as described in S104 of FIG. 5. The text area expansion unit 202 converts the 2D quantization data Q2D into 2D quantization expansion data EQ2D by using the first mask M1. The text area expansion unit 202 performs the conversion as described in S104 of FIG. 5. The text area processor 203 converts the 2D quantization expansion data EQ2D into 2D detection data D2D by using the second mask M2 and the third mask M3. The text area processor 203 performs the conversion as described in S104 of FIG. 5. The coordinate extractor 204 extracts 2D coordinates C2D. The coordinate extractor 204 performs a coordinate extraction as described in S104 in FIG. 5. (See S204 in FIG. 12.)

The data converter 141E receives the original 2D image data RGB2D from the data expansion unit 141A, and the 2D coordinates C2D from the text area detector 141D. The data converter 141E receives the mode signal MODE from the host system 150. The data converter 141E may distinguish the 2D mode from the 3D mode according to the mode signal MODE. The data converter 141E generates the converted 2D image data RGB2D' by applying a sharpness filter for improving visibility of the text area to the original 2D image data RGB2D corresponding to the 2D coordinates C2D. The sharpness filter is implemented as a filter well-known in a prior art. (See S205 in FIG. 12.)

The 3D formatter 142 receives the converted 2D image data RGB2D' from the data converter 141E. The 3D formatter 142 receives the mode signal MODE from the host system 150. The 3D formatter 142 may distinguish the 2D mode from the 3D mode according to the mode signal MODE. The 3D formatter 142 outputs the converted 2D image data RGB2D' as it is to the timing controller 130 without converting the converted 2D image data RGB2D' in the 2D mode. (See S206 in FIG. 12.)

The embodiments described herein may improve readability on the text area by applying a sharpness filter to the original 2D image RGB2D corresponding to the 2D coordinates C2D which is detected as the text area when a stereoscopic image display device implements 2D images in the 2D mode.

Figure 13A:
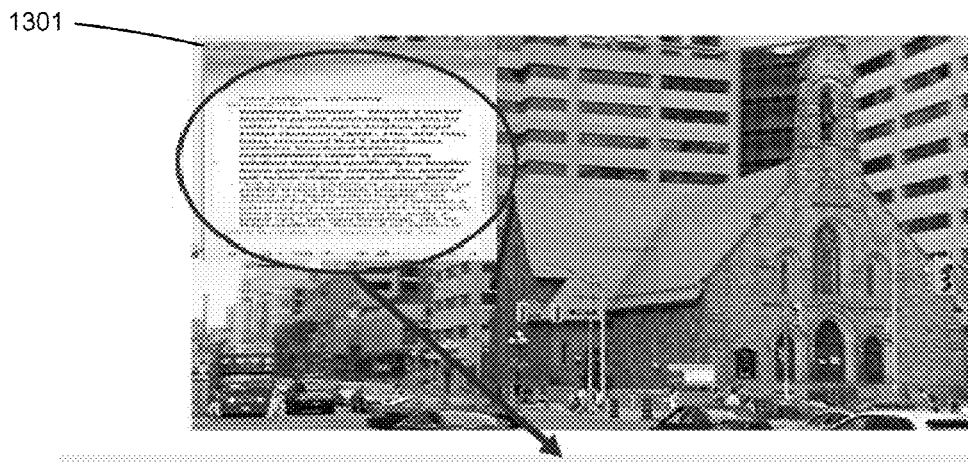
FIG. 13A illustrates a screen shot of a conventional 3D image including a text area.
Figure 13B:
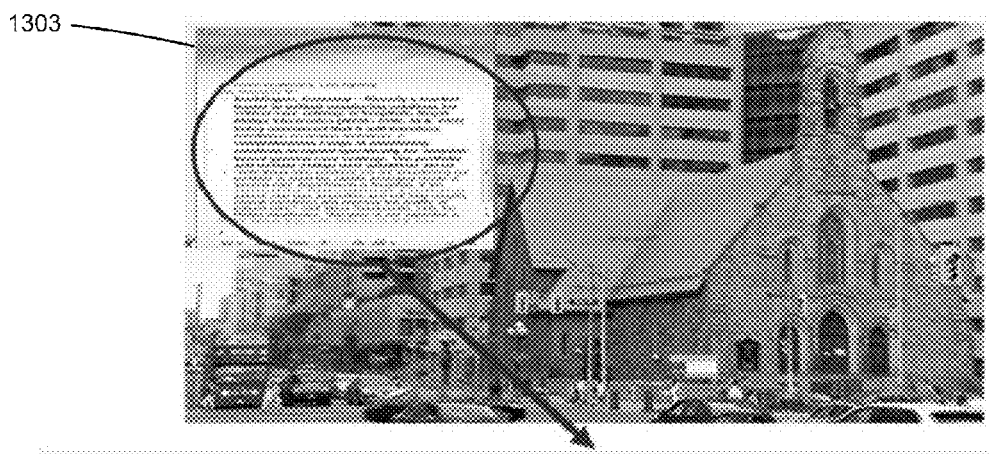
FIG. 13B illustrates a screen shot of a 3D image including a text area according to one embodiment.

FIG. 13A illustrates a screen shot of a conventional 3D image including a text area 1301. FIG. 13B illustrates a screen shot of a 3D image including a text area 1303 implemented according to one embodiment. In both FIGS. 13A and 13B, the text area is enlarged.

As shown in FIG. 13A, the 3D image including the text area 1301 has poor readability, so a user cannot identify characters in the text area 1301. However, as shown in FIG. 13B, the 3D image including the text area 1303 implemented according to the embodiments discussed herein has high readability, so a user can easily identify characters on the text area.

The embodiments described herein convert the left-eye image data RGBL corresponding to the left-eye coordinates CL into a mean of the left-eye image data RGBL corresponding to the left-eye coordinates CL and the left-eye image data RGBL adjacent to thereof on the other line. Also, the embodiments described herein convert the right-eye image data RGBR corresponding to the right-eye coordinates CR into a mean of the right-eye image data RGBR corresponding to the right-eye coordinates CR and the right-eye image data RGBR adjacent to thereof on the other line. Therefore, the embodiments described herein may compensate for the left-eye conversion data CRGBL or the right-eye conversion data CRGBR which are not arranged on a 3D format. As a result, the embodiments described herein may improve readability of the text area.

Also, The embodiments described herein may improve readability on the text area by applying a sharpness filter to the original 2D image RGB2D corresponding to the 2D coordinates C2D which is detected as the text area when a stereoscopic image display device implements 2D images in the 2D mode.

Although the embodiments of this application have been described with reference to a number of illustrative embodiments thereof, it should be understood that numerous other modifications and embodiments of this application can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing method comprising:
   (A) converting left-eye image data into left-eye edge data, and right-eye image data into right-eye edge data;
   (B) extracting left-eye coordinates corresponding to a text area of a left-eye image and right-eye coordinates corresponding to the text area of a right-eye image by analyzing the left-edge data and right-edge data respectively;
   (C) generating by an image processor, for each left-eye coordinate, left-eye conversion data by converting the left-eye image data corresponding to the left-eye coordinate into an average of the left-eye image data corresponding to the left-eye coordinate and another left-eye image data adjacent to the left-eye image data corresponding to the left-eye coordinate, and generating by the image processor, for each right-eye coordinate, right-eye conversion data by converting the right-eye image data corresponding to the right-eye coordinate into an average of the right-eye image data corresponding to the right-eye coordinate and another right-eye image data adjacent to the right-eye image data corresponding to the right-eye coordinate;
   (D) generating three dimensional (3D) image data by converting the left-eye conversion data and the right-eye conversion data according to a 3D format method; and
   (E) displaying a 3D image corresponding to the 3D image data on a display device.

2. The image processing method of claim 1, wherein analyzing the left-edge data and right-edge data respectively of the step (B) includes:
   (B-1) generating left-eye quantization data and right-eye quantization data by converting the left-eye edge data and the right-eye edge data that is greater than an edge data threshold value into a maximum gray level and converting the left-eye edge data and the right-eye edge data that is less than or equal to the edge data threshold value into a minimum gray level;
   (B-2) converting the left-eye quantization data and the right-eye quantization data into left-eye quantization expansion data and right-eye quantization expansion data while shifting a first mask with a size of the first mask, wherein the first mask is a horizontal mask; and (B-3) converting the left-eye quantization expansion data and the right-eye quantization expansion data into left-eye detection data and right-eye detection data while shifting a second mask with the size of the second mask and a third mask with the mask size of the third mask*, wherein the second mask is the horizontal mask and the third mask is a vertical mask.

3. The image processing method of claim 2, wherein the step (B) further includes:

(B-4) extracting the left-eye detection data having the maximum gray level, and the right-eye detection data having the maximum gray level, wherein a coordinate of the extracted left-eye detection data is defined as the left-eye coordinate, and a coordinate of the extracted right-eye detection data is defined as the right-eye coordinate.

4. The image processing method of claim 2, wherein the step (B-2) includes:

setting the first mask on the left-eye quantization data and the right-eye quantization data before the first mask is shifted; and generating the left-eye quantization expansion data and the right-eye quantization expansion data by converting all of the left-eye quantization data or all of the right-eye quantization data included in the first mask into the maximum value among all of the left-eye quantization data or all of the right-eye quantization data included in the first mask.

5. The image processing method of claim 3, wherein the step (B-3) includes:

setting the second mask on the left-eye quantization expansion data and the right-eye quantization expansion data before the second mask is shifted;

maintaining all of the left-eye quantization expansion data or all of the right-eye quantization expansion data included in the second mask if all of the left-eye quantization expansion data or all of the right-eye quantization expansion data included in the second mask have the maximum gray level value;

converting all of the left-eye quantization expansion data or all of the right-eye quantization expansion data included in the second mask into the minimum gray level value if any one of the left-eye quantization expansion data or any one of the right-eye quantization expansion data included in the second mask is associated with the minimum gray level value;

setting the third mask on the left-eye quantization expansion data and the right-eye quantization expansion data before the third mask is shifted;

maintaining all of the left-eye quantization expansion data or all of the right-eye quantization expansion data included in the third mask if all of the left-eye quantization expansion data or all of the right-eye quantization expansion data included in the third mask is associated with the maximum gray level value; and converting all of the left-eye quantization expansion data or all of the right-eye quantization expansion data included in the third mask into the minimum gray level value if any one of the left-eye quantization expansion data or any one of the right-eye quantization expansion data included in the third mask is associated with the minimum gray level value.

6. The image processing method of claim 2, wherein the size of the second mask and the size of the third mask are larger responsive to higher complexity of the image.

7. The image processing method of claim 1, wherein the step (C) includes:

if the left-eye coordinate is a coordinate (a,b) and the right-eye coordinate is a coordinate (c,d), converting the left-eye image data corresponding to the coordinate (a,b) into an average of the left-eye image data corresponding to the coordinate (a,b) and the left-eye image data corresponding to a coordinate (a−1,b), and the right-eye image data corresponding to the coordinate (c,d) into an average of the right-eye image data corresponding to the coordinate (c,d) and the right-eye image data corresponding to a coordinate (c−1,d), wherein each of a, b, c, and d is a natural number, and each of a and c is greater than 1.

8. The image processing method of claim 1, wherein the step (C) includes:

if the left-eye coordinate is a coordinate (a,b) and the right-eye coordinate CL is a coordinate (c,d), converting the left-eye image data corresponding to a coordinate (a,b) into an average of the left-eye image data corresponding to the coordinate (a,b) and the left-eye image data corresponding to a coordinate (a+1,b) when the coordinate (a,b) is on an odd-numbered line, and the right-eye image data corresponding to the coordinate (c,d) into an average of the right-eye image data corresponding to the coordinate (c,d) and the right-eye image data corresponding to a coordinate (c+1,d) when the coordinate (c,d) is on the odd-numbered line; and converting the left-eye image data corresponding to the coordinate (a,b) into an average of the left-eye image data corresponding to the coordinate (a,b) and the left-eye image data corresponding to a coordinate (a−1,b) when the coordinate (a,b) is on an even-numbered line, and the right-eye image data corresponding to the coordinate (c,d) into an average of the right-eye image data corresponding to the coordinate (c,d) and the right-eye image data corresponding to a coordinate (c−1,d) when the coordinate (c,d) is on the even-numbered line, wherein each of a, b, c, and d is a natural number and each of a and c is greater than 1.

9. The image processing method of claim 1, wherein the step (D) includes:

generating converted 3D image data by arranging the left-eye conversion data of odd-numbered lines on the odd-numbered lines, and the right-eye conversion data of even-numbered lines on the even-numbered lines, or generating converted 3D image data by arranging the left-eye conversion data of the even-numbered lines on the odd-numbered lines, and the right-eye conversion data of the odd-numbered lines on the even-numbered lines.

10. The image processing method of claim 1, wherein the step (D) includes:

generating converted 3D image data by arranging the left-eye conversion data of odd-numbered lines on the odd-numbered lines of a Nth frame, the right-eye conversion data of even-numbered lines on the even-numbered lines of the Nth frame, the left-eye conversion data of the even-numbered lines on the odd-numbered lines of a (N+1)th frame, and the right-eye conversion data of the odd-numbered lines on the even-numbered lines of the (N+1)th frame, wherein N is a natural number.

11. An image processor comprising:

an edge converter configured to convert left-eye image data into left-eye edge data, and right-eye image data into right-eye edge data;

a text area detector configured to extract left-eye coordinates corresponding to a text area of a left-eye image and right-eye coordinates corresponding to the text area of a right-eye image by analyzing the left-edge data and right-edge data respectively;

a data converter configured to generate, for each left-eye coordinate, left-eye conversion data by converting a left-eye image data corresponding to the left-eye coordinate into an average of the left-eye image data corresponding to the left-eye coordinate and another left-eye image data adjacent to the left-eye image data corresponding to the left-eye coordinate, and generate, for each right-eye coordinate, right-eye conversion data by converting a right-eye image data corresponding to the right-eye coordinate into an average of the right-eye image data corresponding to the right-eye coordinate and another right-eye image data adjacent to the right-eye image data corresponding to the right-eye coordinate; and a 3D formatter configured to generates 3D image data by converting the left-eye conversion data and the right-eye conversion data according to a 3D format method.

12. The image processor of claim 11, wherein the text area detector includes:

a quantization processor configured to generate left-eye quantization data and right-eye quantization data by converting the left-eye edge data and the right-eye edge data greater than an edge data threshold value into a maximum gray level and converting the left-eye edge data and the right-eye edge data that is less than or equal to the edge data threshold value into a minimum gray level;

a text area expansion unit configured to convert the left-eye quantization data and the right-eye quantization data into left-eye quantization expansion data and right-eye quantization expansion data while shifting a first mask with a size of the first mask, wherein the first mask is a horizontal mask; and a text area processor configured to convert the left-eye quantization expansion data and the right-eye quantization expansion data into left-eye detection data and right-eye detection data while shifting a second mask with the size of the second mask and a third mask with the mask size of the third mask, wherein the second mask is the horizontal mask and the third mask is a vertical mask.

13. The image processor of claim 12, wherein the text area detector further includes:

a coordinate extractor configured to extract the left-eye detection data having the maximum gray level, and the right-eye detection data having the maximum gray level, wherein a coordinate of the extracted left-eye detection data is defined as the left-eye coordinate, and a coordinate of the extracted right-eye detection data is defined as the right-eye coordinate.

14. The image processor of claim 12, wherein the text area expansion unit configured to:

set the first mask on the left-eye quantization data and the right-eye quantization data before the first mask is shifted; and generate the left-eye quantization expansion data and the right-eye quantization expansion data by converting all of the left-eye quantization data or all of the right-eye quantization data included in the first mask into the maximum value among all of the left-eye quantization data or all of the right-eye quantization data included in the first mask.

15. The image processor of claim 12, wherein the text area processor configured to:

set the second mask on the left-eye quantization expansion data and the right-eye quantization expansion data before the second mask is shifted;

maintain all of the left-eye quantization expansion data or all of the right-eye quantization expansion data included in the second mask if all of the left-eye quantization expansion data or all of the right-eye quantization expansion data included in the second mask have the maximum gray level value;

convert all of the left-eye quantization expansion data or all of the right-eye quantization expansion data included in the second mask into the minimum gray level value if any one of the left-eye quantization expansion data or any one of the right-eye quantization expansion data included in the second mask is associated with the minimum gray level value;

set the third mask on the left-eye quantization expansion data and the right-eye quantization expansion data before the third mask is shifted;

maintain all of the left-eye quantization expansion data or all of the right-eye quantization expansion data included in the third mask if all of the left-eye quantization expansion data or all of the right-eye quantization expansion data included in the third mask is associated with the maximum gray level value; and convert all of the left-eye quantization expansion data or all of the right-eye quantization expansion data included in the third mask into the minimum gray level value if any one of the left-eye quantization expansion data or any one of the right-eye quantization expansion data included in the third mask is associated with the minimum gray level value.

16. The image processor of claim 12, wherein the size of the second mask and the size of the third mask are larger responsive to higher complexity of the image.

17. The image processor of claim 11, wherein the data converter configured to:

if the left-eye coordinate is a coordinate (a,b) and the right-eye coordinate is a coordinate (c,d), converting the left-eye image data corresponding to the coordinate (a,b) into an average of the left-eye image data corresponding to the coordinate (a,b) and the left-eye image data corresponding to a coordinate (a−1,b), and the right-eye image data corresponding to the coordinate (c,d) into an average of the right-eye image data corresponding to the coordinate (c,d) and the right-eye image data corresponding to a coordinate (c−1,d), wherein each of a, b, c, and d is a natural number, and each of a and c is greater than 1.

18. The image processor of claim 11, wherein the data converter is further configured to:

if the left-eye coordinate is a coordinate (a,b) and the right-eye coordinate CL is a coordinate (c,d), convert the left-eye image data corresponding to a coordinate (a,b) into an average of the left-eye image data corresponding to the coordinate (a,b) and the left-eye image data corresponding to a coordinate (a+1,b) when the coordinate (a,b) is on an odd-numbered line, and the right-eye image data corresponding to the coordinate (c,d) into an average of the right-eye image data corresponding to the coordinate (c,d) and the right-eye image data corresponding to a coordinate (c+1,d) when the coordinate (c,d) is on the odd-numbered line; and convert the left-eye image data corresponding to the coordinate (a,b) into an average of the left-eye image data corresponding to the coordinate (a,b) and the left-eye image data corresponding to a coordinate (a−1,b) when the coordinate (a,b) is on an even-numbered line, and the right-eye image data corresponding to the coordinate (c,d) into an average of the right-eye image data corresponding to the coordinate (c,d) and the right-eye image data corresponding to a coordinate (c−1,d) when the coordinate (c,d) is on the even-numbered line, wherein each of a, b, c, and d is a natural number and each of a and c is greater than 1.

19. The image processor of claim 11, wherein the 3D formatter if further configured to:

generate converted 3D image data by arranging the left-eye conversion data of odd-numbered lines on the odd-numbered lines, and the right-eye conversion data of even-numbered lines on the even-numbered lines, or generate converted 3D image data by arranging the left-eye conversion data of the even-numbered lines on the odd-numbered lines, and the right-eye conversion data of the odd-numbered lines on the even-numbered lines.

20. The image processor of claim 11, wherein the 3D formatter is configured to generate converted 3D image data by arranging the left-eye conversion data of odd-numbered lines on the odd-numbered lines of a Nth frame, the right-eye conversion data of even-numbered lines on the even-numbered lines of the Nth frame, the left-eye conversion data of the even-numbered lines on the odd-numbered lines of a (N+1)th frame, and the right-eye conversion data of the odd-numbered lines on the even-numbered lines of the (N+1)th frame, wherein N is a natural number.

21. A stereoscopic image display device comprising:

a display panel including scan lines and data lines;

an image processor configured to supply converted 3D image data by detecting a text area of an image and improving readability of the text area;

a data driver configured to convert the converted 3D image data into data voltages and supply the data voltages to the data lines; and a gate driver configured to sequentially supply gate pulses synchronized with the data voltage to the gate lines, wherein the image processor includes:

an edge converter configured to convert left-eye image data into left-eye edge data, and right-eye image data into right-eye edge data;

a text area detector configured to extract left-eye coordinates corresponding to a text area of a left-eye image and right-eye coordinates corresponding to the text area of a right-eye image by analyzing the left-edge data and right-edge data respectively;

a data converter configured to generate, for each left-eye coordinate, left-eye conversion data by converting a left-eye image data corresponding to the left-eye coordinate into an average of the left-eye image data corresponding to the left-eye coordinate and another left-eye image data adjacent to the left-eye image data corresponding to the left-eye coordinate, and generate, for each right-eye coordinate, right-eye conversion data by converting a right-eye image data corresponding to the right-eye coordinate into an average of the right-eye image data corresponding to the right-eye coordinate and another right-eye image data adjacent to the right-eye image data corresponding to the right-eye coordinate; and a 3D formatter configured to generates 3D image data by converting the left-eye conversion data and the right-eye conversion data according to a 3D format method.

* * * * *